US012691531B2

(12) United States Patent
Mikutis

(10) Patent No.: US 12,691,531 B2
(45) Date of Patent: Jul. 28, 2026

(54) METHOD AND DEVICE FOR LASER PROCESSING OF TRANSPARENT MATERIALS

(71) Applicant: UAB Altechna R&D, Vilnius (LT)

(72) Inventor: Mindaugas Mikutis, Vilnius (LT)

(73) Assignee: UAB ALTECHNA R&D, Vilnius (LT)

( * ) Notice: Subject to any disclaimer, the term of this patent is extended or adjusted under 35 U.S.C. 154(b) by 668 days.

(21) Appl. No.: 15/761,596

(22) PCT Filed: Sep. 30, 2016

(86) PCT No.: PCT/EP2016/073460
§ 371 (c)(1),
(2) Date: Mar. 20, 2018

(87) PCT Pub. No.: WO2017/055576
PCT Pub. Date: Apr. 6, 2017

(65) Prior Publication Data
US 2018/0345419 A1 Dec. 6, 2018

(30) Foreign Application Priority Data
Oct. 2, 2015 (LT) ..................................... 2015 085

(51) Int. Cl.
*B23K 26/53* (2014.01)
*B23K 26/00* (2014.01)
(Continued)

(52) U.S. Cl.
CPC .......... *B23K 26/53* (2015.10); *B23K 26/0006* (2013.01); *B23K 26/0626* (2013.01);
(Continued)

(58) Field of Classification Search
CPC ............ B23K 26/0006; B23K 26/0626; B23K 26/064; B23K 26/0648; B23K 26/0652;
(Continued)

(56) References Cited

U.S. PATENT DOCUMENTS 1,790,397 A 1/1931 Woods et al.
2,682,134 A 6/1954 Stookey
(Continued)

FOREIGN PATENT DOCUMENTS

CN 1259924 A 7/2000
CN 2388062 Y 7/2000
(Continued)

OTHER PUBLICATIONS

Mcgloin et al."Bessel beams: diffraction in a new light" Contemporary Physics, vol. 46 No. 1 (2005) pp. 15-28.
(Continued)

*Primary Examiner* — Vy T Nguyen
(74) *Attorney, Agent, or Firm* — Womble Bond Dickinson (US) LLP

(57) ABSTRACT

Invention relates to the field of lasers, particularly to laser processing of transparent materials and can be used for cutting, breaking and other kind of processing of transparent materials, such as glass, chemically strengthened glass, sapphire and other crystalline materials, employing ultrashort pulse asymmetric Gauss-Bessel intensity profile laser beam. Gaussian intensity profile ultrashort pulse laser beam is transformed to asymmetric Gauss-Bessel intensity profile laser beam by inserting an optical element in Gaussian or Gauss-Bessel intensity profile laser beam path. Asymmetry of Gauss-Bessel intensity profile laser beam is set by selecting appropriate material of the optical element and/or parameters of the optical element and/or position of the optical element in the optical beam path in such a manner, that Gauss-Bessel intensity profile laser beam, localized in the workpiece, has an elongated shape in the propagation direction of the laser beam and in the plane, perpendicular to the direction of propagation of said laser beam and induces correspondingly elongated shape damage region in (Continued)

the workpiece. Controlled displacement of the workpiece and the laser beam in respect to each other is performed to create a required number of additional elongated shape damage regions and to arrange them in the workpiece longitudinally one after other along the predefined trajectory forming the cutting and/or breaking plane of the workpiece.

24 Claims, 6 Drawing Sheets

(51) Int. Cl.

| | |
|---|---|
| *B23K 26/06* | (2014.01) |
| *B23K 26/062* | (2014.01) |
| *B23K 26/064* | (2014.01) |
| *B23K 26/073* | (2006.01) |
| *B23K 26/08* | (2014.01) |
| *C03B 33/02* | (2006.01) |

(52) U.S. Cl.
CPC ........ *B23K 26/064* (2015.10); *B23K 26/0648* (2013.01); *B23K 26/0652* (2013.01); *B23K 26/0736* (2013.01); *B23K 26/0823* (2013.01); *C03B 33/0222* (2013.01); *Y02P 40/57* (2015.11)

(58) Field of Classification Search
CPC ............ B23K 26/0736; B23K 26/0823; B23K 26/53; C03B 33/0222; C21B 5/001; Y02P 40/57; Y10T 137/2514
USPC ............ 219/121.67, 121.72, 121.73, 121.74, 219/121.75, 121.76, 121.77, 121.84, 219/121.85
See application file for complete search history.

(56) References Cited

U.S. PATENT DOCUMENTS

| | | | |
|---|---|---|---|
| 2,749,794 A | 6/1956 | O'Leary | |
| 3,647,410 A | 3/1972 | Heaton et al. | |
| 3,695,497 A | 10/1972 | Dear | |
| 3,695,498 A | 10/1972 | Dear | |
| 3,729,302 A | 4/1973 | Heaton | |
| 3,775,084 A | 11/1973 | Heaton | |
| 4,226,607 A | 10/1980 | Domken | |
| 4,441,008 A | 4/1984 | Chan | |
| 4,546,231 A | 10/1985 | Gresser et al. | |
| 4,646,308 A | 2/1987 | Kafka et al. | |
| 4,764,930 A | 8/1988 | Bille et al. | |
| 4,891,054 A | 1/1990 | Bricker et al. | |
| 4,907,586 A | 3/1990 | Bille et al. | |
| 4,918,751 A | 4/1990 | Pessot et al. | |
| 4,929,065 A | 5/1990 | Hagerty et al. | |
| 5,035,918 A | 7/1991 | Vyas | |
| 5,040,182 A | 8/1991 | Spinelli et al. | |
| 5,104,210 A | 4/1992 | Tokas | |
| 5,104,523 A | 4/1992 | Masaharu et al. | |
| 5,108,857 A | 4/1992 | Kitayama et al. | |
| 5,112,722 A | 5/1992 | Tsujino et al. | |
| 5,114,834 A | 5/1992 | Nachshon | |
| 5,265,107 A | 11/1993 | Delfyett, Jr. | |
| 5,400,350 A | 3/1995 | Galvanauskas | |
| 5,410,567 A | 4/1995 | Brundage et al. | |
| 5,418,803 A * | 5/1995 | Zhiglinsky | H01S 3/08009 |
| | | | 372/101 |
| 5,434,875 A | 7/1995 | Rieger et al. | |
| 5,436,925 A | 7/1995 | Iin et al. | |
| 5,521,352 A * | 5/1996 | Lawson | B23K 26/067 |
| | | | 219/121.67 |
| 5,553,093 A | 9/1996 | Ramaswamy et al. | |
| 5,574,597 A | 11/1996 | Kataoka | |
| 5,578,229 A * | 11/1996 | Barnekov | B27M 1/06 |
| | | | 219/121.72 |
| 5,586,138 A | 12/1996 | Yokoyama | |
| 5,696,782 A | 12/1997 | Harter et al. | |
| 5,715,346 A | 2/1998 | Liu | |
| 5,736,061 A | 4/1998 | Fukada et al. | |
| 5,736,709 A | 4/1998 | Neiheisel | |
| 5,776,220 A | 7/1998 | Allaire et al. | |
| 5,781,684 A | 7/1998 | Liu | |
| 6,016,223 A | 1/2000 | Suzuki et al. | |
| 6,038,055 A | 3/2000 | Hansch et al. | |
| 6,055,829 A | 5/2000 | Witzmann et al. | |
| 6,078,599 A | 6/2000 | Everage et al. | |
| 6,156,030 A | 12/2000 | Neev | |
| 6,160,835 A | 12/2000 | Kwon | |
| 6,186,384 B1 | 2/2001 | Sawada | |
| 6,210,401 B1 | 4/2001 | Lai | |
| 6,256,328 B1 | 7/2001 | Delfyett et al. | |
| 6,259,058 B1 | 7/2001 | Hoekstra | |
| 6,259,151 B1 | 7/2001 | Morrison | |
| 6,259,512 B1 | 7/2001 | Mizouchi | |
| 6,272,156 B1 | 8/2001 | Reed et al. | |
| 6,301,932 B1 | 10/2001 | Allen et al. | |
| 6,322,958 B1 | 11/2001 | Hayashi | |
| 6,339,208 B1 | 1/2002 | Rockstroh et al. | |
| 6,373,565 B1 | 4/2002 | Kafka et al. | |
| 6,381,391 B1 | 4/2002 | Islam et al. | |
| 6,396,856 B1 | 5/2002 | Sucha et al. | |
| 6,407,360 B1 | 6/2002 | Choo et al. | |
| 6,438,996 B1 | 8/2002 | Cuvelier | |
| 6,445,491 B2 | 9/2002 | Sucha et al. | |
| 6,449,301 B1 | 9/2002 | Wu et al. | |
| 6,484,052 B1 | 11/2002 | Visuri et al. | |
| 6,489,589 B1 | 12/2002 | Alexander | |
| 6,501,578 B1 | 12/2002 | Bernstein et al. | |
| 6,552,301 B2 | 4/2003 | Herman et al. | |
| 6,573,026 B1 | 6/2003 | Aitken et al. | |
| 6,592,703 B1 | 7/2003 | Habeck et al. | |
| 6,614,720 B1 | 9/2003 | Ogata et al. | |
| 6,635,849 B1 | 10/2003 | Okawa et al. | |
| 6,635,850 B2 | 10/2003 | Amako et al. | |
| 6,720,519 B2 | 4/2004 | Liu et al. | |
| 6,729,161 B1 | 5/2004 | Miura et al. | |
| 6,737,345 B1 | 5/2004 | Lin et al. | |
| 6,787,732 B1 | 9/2004 | Xuan et al. | |
| 6,800,237 B1 | 10/2004 | Yamamoto et al. | |
| 6,800,831 B1 | 10/2004 | Hoetzel | |
| 6,958,094 B2 | 10/2005 | Ohmi et al. | |
| 6,992,026 B2 | 1/2006 | Fukuyo et al. | |
| 7,009,138 B2 | 3/2006 | Amako et al. | |
| 7,061,583 B2 | 6/2006 | Mulkens et al. | |
| 7,353,829 B1 | 4/2008 | Wachter | |
| 7,511,886 B2 | 3/2009 | Schultz et al. | |
| 7,535,634 B1 | 5/2009 | Savchenkov et al. | |
| 7,626,138 B2 * | 12/2009 | Bovatsek | B29C 65/14 |
| | | | 362/559 |
| 7,633,033 B2 | 12/2009 | Thomas et al. | |
| 7,642,483 B2 | 1/2010 | You et al. | |
| 7,649,153 B2 | 1/2010 | Haight et al. | |
| 7,726,532 B2 | 6/2010 | Gonoe | |
| 8,104,385 B2 | 1/2012 | Hayashi et al. | |
| 8,118,971 B2 | 2/2012 | Hori et al. | |
| 8,132,427 B2 | 3/2012 | Brown et al. | |
| 8,168,514 B2 | 5/2012 | Garner et al. | |
| 8,245,539 B2 | 8/2012 | Lu et al. | |
| 8,245,540 B2 | 8/2012 | Abramov et al. | |
| 8,269,138 B2 | 9/2012 | Garner et al. | |
| 8,283,595 B2 | 10/2012 | Fukuyo et al. | |
| 8,292,141 B2 | 10/2012 | Cox et al. | |
| 8,296,066 B2 | 10/2012 | Zhao et al. | |
| 8,327,666 B2 | 12/2012 | Harvey et al. | |
| 8,341,976 B2 | 1/2013 | Dejneka et al. | |
| 8,347,651 B2 | 1/2013 | Abramov et al. | |
| 8,358,888 B2 | 1/2013 | Ramachandran | |
| 8,444,906 B2 | 5/2013 | Lee et al. | |
| 8,448,471 B2 | 5/2013 | Kumatani et al. | |
| 8,518,280 B2 | 8/2013 | Hsu et al. | |
| 8,549,881 B2 | 10/2013 | Brown et al. | |
| 8,584,354 B2 | 11/2013 | Cornejo et al. | |
| 8,584,490 B2 | 11/2013 | Garner et al. | |
| 8,592,716 B2 | 11/2013 | Abramov et al. | |

(56) References Cited

U.S. PATENT DOCUMENTS

| | | | |
|---|---|---|---|
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Pluss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 9,517,929 B2 | 12/2016 | Hosseini |
| 9,878,304 B2 | 1/2018 | Kotake et al. |
| 10,730,783 B2 | 8/2020 | Akarapu et al. |
| 2001/0027842 A1 | 10/2001 | Curcio et al. |
| 2002/0006765 A1 | 1/2002 | Michel et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2002/0170898 A1 | 11/2002 | Ehrmann et al. |
| 2003/0006221 A1 | 1/2003 | Hong et al. |
| 2003/0007772 A1 | 1/2003 | Borrelli et al. |
| 2004/0221615 A1 | 11/2004 | Postupack et al. |
| 2005/0024743 A1 | 2/2005 | Camy-Peyret |
| 2005/0098458 A1 | 5/2005 | Gruetzmacher et al. |
| 2005/0098548 A1 | 5/2005 | Kobayashi et al. |
| 2005/0115938 A1 | 6/2005 | Sawaki et al. |
| 2005/0274702 A1* | 12/2005 | Deshi ..................... B23K 26/40 |
| | | 219/121.72 |
| 2006/0011593 A1 | 1/2006 | Fukuyo et al. |
| 2006/0039057 A1 | 2/2006 | Han et al. |
| 2006/0109874 A1 | 5/2006 | Shiozaki et al. |
| 2006/0124618 A1 | 6/2006 | Riken |
| 2006/0127679 A1 | 6/2006 | Gulati et al. |
| 2006/0213883 A1 | 9/2006 | Eberhardt et al. |
| 2006/0227440 A1 | 10/2006 | Gluckstad |
| 2006/0289410 A1 | 12/2006 | Morita et al. |
| 2007/0021548 A1 | 1/2007 | Hattori et al. |
| 2007/0044606 A1 | 3/2007 | Kang et al. |
| 2007/0053632 A1* | 3/2007 | Popp ..................... G02B 6/3604 |
| | | 385/26 |
| 2007/0090180 A1 | 4/2007 | Griffis et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0061043 A1 | 3/2008 | Fujii |
| 2008/0099444 A1 | 5/2008 | Misawa et al. |
| 2008/0190981 A1 | 8/2008 | Okajima et al. |
| 2008/0310465 A1* | 12/2008 | Achtenhagen ............ H01S 5/14 |
| | | 372/22 |
| 2009/0013724 A1 | 1/2009 | Koyo et al. |
| 2009/0104721 A1 | 4/2009 | Hirakata et al. |
| 2009/0157341 A1 | 6/2009 | Cheung |
| 2009/0176034 A1 | 7/2009 | Ruuttu et al. |
| 2009/0183764 A1 | 7/2009 | Meyer |
| 2009/0184849 A1 | 7/2009 | Nasiri et al. |
| 2009/0199694 A1 | 8/2009 | Uh et al. |
| 2009/0250446 A1 | 10/2009 | Sakamoto |
| 2009/0272149 A1 | 11/2009 | Abramov et al. |
| 2009/0286091 A1 | 11/2009 | Danielson et al. |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0020304 A1 | 1/2010 | Soer et al. |
| 2010/0024865 A1 | 2/2010 | Shah et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0145620 A1 | 6/2010 | Georgi et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0191024 A1 | 8/2011 | Deluca |
| 2011/0238308 A1 | 9/2011 | Miller et al. |
| 2011/0240476 A1 | 10/2011 | Wang et al. |
| 2011/0240611 A1 | 10/2011 | Sandstrom |
| 2011/0261429 A1 | 10/2011 | Sbar et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0106117 A1 | 5/2012 | Sundaram et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0031879 A1 | 2/2013 | Yoshikane et al. |
| 2013/0034688 A1 | 2/2013 | Koike et al. |
| 2013/0044371 A1 | 2/2013 | Rupp et al. |
| 2013/0068736 A1 | 3/2013 | Mielke et al. |
| 2013/0075480 A1 | 3/2013 | Yokogi et al. |
| 2013/0078891 A1 | 3/2013 | Lee et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0222878 A1 | 8/2013 | Greer et al. |

(56) References Cited

U.S. PATENT DOCUMENTS

| | | | |
|---|---|---|---|
| 2013/0224439 A1 | 8/2013 | Zhang et al. | |
| 2013/0228918 A1 | 9/2013 | Chen et al. | |
| 2013/0247615 A1 | 9/2013 | Boek et al. | |
| 2013/0266757 A1 | 10/2013 | Giron et al. | |
| 2013/0270240 A1 | 10/2013 | Kondo | |
| 2013/0280495 A1 | 10/2013 | Matsumoto | |
| 2013/0288010 A1 | 10/2013 | Akarapu et al. | |
| 2013/0291598 A1 | 11/2013 | Saito et al. | |
| 2013/0312460 A1 | 11/2013 | Kunishi et al. | |
| 2013/0323469 A1 | 12/2013 | Abramov et al. | |
| 2013/0334185 A1 | 12/2013 | Nomaru | |
| 2013/0340480 A1 | 12/2013 | Nattermann et al. | |
| 2014/0023087 A1 | 1/2014 | Czompo | |
| 2014/0027951 A1 | 1/2014 | Srinivas et al. | |
| 2014/0034730 A1 | 2/2014 | Lee | |
| 2014/0042202 A1 | 2/2014 | Lee | |
| 2014/0047957 A1 | 2/2014 | Wu | |
| 2014/0076869 A1* | 3/2014 | Lee | B23K 26/0624 |
| | | | 219/121.75 |
| 2014/0102146 A1 | 4/2014 | Saito et al. | |
| 2014/0110040 A1 | 4/2014 | Cok | |
| 2014/0113797 A1 | 4/2014 | Yamada et al. | |
| 2014/0133119 A1 | 5/2014 | Kariya et al. | |
| 2014/0141217 A1 | 5/2014 | Gulati et al. | |
| 2014/0147623 A1 | 5/2014 | Shorey et al. | |
| 2014/0147624 A1 | 5/2014 | Streltsov et al. | |
| 2014/0151624 A1 | 6/2014 | Ohba et al. | |
| 2014/0165652 A1 | 6/2014 | Saito | |
| 2014/0174131 A1 | 6/2014 | Saito et al. | |
| 2014/0199519 A1 | 7/2014 | Schillinger et al. | |
| 2014/0216108 A1 | 8/2014 | Wiegel et al. | |
| 2014/0239034 A1 | 8/2014 | Cleary et al. | |
| 2014/0290310 A1 | 10/2014 | Green | |
| 2014/0320947 A1 | 10/2014 | Egerton et al. | |
| 2014/0333929 A1 | 11/2014 | Sung et al. | |
| 2014/0352400 A1 | 12/2014 | Barrilado et al. | |
| 2014/0361463 A1 | 12/2014 | Desimone et al. | |
| 2015/0034612 A1 | 2/2015 | Hosseini | |
| 2015/0038313 A1 | 2/2015 | Hosseini | |
| 2015/0044445 A1 | 2/2015 | Garner et al. | |
| 2015/0075221 A1 | 3/2015 | Kawaguchi et al. | |
| 2015/0075222 A1 | 3/2015 | Mader | |
| 2015/0110442 A1 | 4/2015 | Zimmel et al. | |
| 2015/0118522 A1 | 4/2015 | Hosseini | |
| 2015/0136743 A1 | 5/2015 | Hosseini | |
| 2015/0140241 A1 | 5/2015 | Hosseini | |
| 2015/0151380 A1 | 6/2015 | Hosseini | |
| 2015/0158120 A1 | 6/2015 | Courvoisier et al. | |
| 2015/0165548 A1 | 6/2015 | Marjanovic et al. | |
| 2015/0165560 A1 | 6/2015 | Hackert et al. | |
| 2015/0165562 A1 | 6/2015 | Marjanovic et al. | |
| 2015/0165563 A1 | 6/2015 | Manley et al. | |
| 2015/0166391 A1 | 6/2015 | Marjanovic et al. | |
| 2015/0166393 A1 | 6/2015 | Marjanovic et al. | |
| 2015/0166395 A1 | 6/2015 | Marjanovic et al. | |
| 2015/0166396 A1 | 6/2015 | Marjanovic et al. | |
| 2015/0166397 A1 | 6/2015 | Marjanovic et al. | |
| 2015/0183679 A1 | 7/2015 | Saito | |
| 2015/0232369 A1 | 8/2015 | Marjanovic et al. | |
| 2015/0299018 A1* | 10/2015 | Bhuyan | B23K 26/53 |
| | | | 65/29.18 |
| 2015/0367442 A1 | 12/2015 | Bovatsek et al. | |
| 2016/0008927 A1 | 1/2016 | Grundmueller et al. | |
| 2016/0009066 A1 | 1/2016 | Nieber et al. | |
| 2016/0009585 A1 | 1/2016 | Bookbinder et al. | |
| 2016/0016257 A1* | 1/2016 | Hosseini | B23K 26/0648 |
| | | | 65/112 |
| 2016/0023922 A1 | 1/2016 | Addiego et al. | |
| 2016/0031745 A1* | 2/2016 | Ortner | B23K 26/14 |
| | | | 65/29.1 |
| 2016/0039044 A1 | 2/2016 | Kawaguchi | |
| 2016/0060156 A1 | 3/2016 | Krueger et al. | |
| 2016/0154284 A1 | 6/2016 | Sano | |
| 2016/0168396 A1 | 6/2016 | Letocart et al. | |
| 2016/0280580 A1 | 9/2016 | Bohme | |

| | | | |
|---|---|---|---|
| 2016/0290791 A1 | 10/2016 | Buono et al. | |
| 2017/0052381 A1 | 2/2017 | Huang et al. | |
| 2017/0120374 A1 | 5/2017 | Hendricks et al. | |
| 2017/0169847 A1 | 6/2017 | Tamaki | |
| 2017/0368638 A1* | 12/2017 | Tayebati | B23K 26/0648 |

FOREIGN PATENT DOCUMENTS

| | | |
|---|---|---|
| CN | 1489504 A | 4/2004 |
| CN | 1736651 A | 2/2006 |
| CN | 1283409 C | 11/2006 |
| CN | 1890074 A | 1/2007 |
| CN | 1920632 A | 2/2007 |
| CN | 101031383 A | 9/2007 |
| CN | 101043936 A | 9/2007 |
| CN | 101043992 A | 9/2007 |
| CN | 101502914 A | 8/2009 |
| CN | 101595554 A | 12/2009 |
| CN | 201357287 U | 12/2009 |
| CN | 101622722 A | 1/2010 |
| CN | 101637849 A | 2/2010 |
| CN | 201471092 U | 5/2010 |
| CN | 101821071 A | 9/2010 |
| CN | 101980982 A | 2/2011 |
| CN | 102066034 A | 5/2011 |
| CN | 102105256 A | 6/2011 |
| CN | 102233485 A | 11/2011 |
| CN | 102248302 A | 11/2011 |
| CN | 102343631 A | 2/2012 |
| CN | 102642092 A | 8/2012 |
| CN | 102649199 A | 8/2012 |
| CN | 102672355 A | 9/2012 |
| CN | 102741012 A | 10/2012 |
| CN | 102785031 A | 11/2012 |
| CN | 102898014 A | 1/2013 |
| CN | 102916081 A | 2/2013 |
| CN | 102923939 A | 2/2013 |
| CN | 103013374 A | 4/2013 |
| CN | 103086591 A | 5/2013 |
| CN | 103143841 A | 6/2013 |
| CN | 203021443 U | 6/2013 |
| CN | 103273195 A | 9/2013 |
| CN | 103316990 A | 9/2013 |
| CN | 103329035 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 103817434 A | 5/2014 |
| CN | 103831539 A | 6/2014 |
| CN | 104108870 A | 10/2014 |
| CN | 104344202 A | 2/2015 |
| CN | 204211638 U | 3/2015 |
| CN | 105081564 A | 11/2015 |
| CN | 105209218 A | 12/2015 |
| CN | 205328860 U | 6/2016 |
| CN | 106007349 A | 10/2016 |
| DE | 1020448 B | 12/1957 |
| DE | 2231330 A1 | 1/1974 |
| DE | 10200603555 A1 | 1/2008 |
| DE | 102012010635 A1 | 11/2013 |
| DE | 102013223637 A1 | 5/2015 |
| DE | 102014213775 A1 | 1/2016 |
| DE | 102016102768 A1 | 8/2017 |
| EP | 0270897 A1 | 6/1988 |
| EP | 0609978 A1 | 8/1994 |
| EP | 0938946 A1 | 9/1999 |
| EP | 1159104 B1 | 8/2004 |
| EP | 2105239 A1 | 9/2009 |
| EP | 2133170 A1 | 12/2009 |
| EP | 2202545 A1 | 6/2010 |
| EP | 2783784 A2 | 10/2014 |
| EP | 2965853 A1 | 1/2016 |
| FR | 2989294 A1 | 10/2013 |
| GB | 0768515 A | 2/1957 |
| GB | 1242172 A | 8/1971 |
| JP | 61-074794 A | 4/1986 |
| JP | 62-046930 A | 2/1987 |

(56) References Cited

FOREIGN PATENT DOCUMENTS

| JP | 63-192561 A | 8/1988 |
|----|----|----|
| JP | 1179770 A | 7/1989 |
| JP | 06-082720 A | 3/1994 |
| JP | 6318756 A | 11/1994 |
| JP | 09106243 A | 4/1997 |
| JP | 11269683 A | 10/1999 |
| JP | 11-347861 A | 12/1999 |
| JP | 11347758 A | 12/1999 |
| JP | 2001-130921 A | 5/2001 |
| JP | 2001138083 A | 5/2001 |
| JP | 2002-205181 A | 7/2002 |
| JP | 2002228818 A | 8/2002 |
| JP | 2003062756 A | 3/2003 |
| JP | 2003114400 A | 4/2003 |
| JP | 2003154517 A | 5/2003 |
| JP | 2003238178 A | 8/2003 |
| JP | 2003-340579 A | 12/2003 |
| JP | 2004-182530 A | 7/2004 |
| JP | 2004209675 A | 7/2004 |
| JP | 2005104819 A | 4/2005 |
| JP | 2005-144487 A | 6/2005 |
| JP | 2005205440 A | 8/2005 |
| JP | 2005-263623 A | 9/2005 |
| JP | 2005288503 A | 10/2005 |
| JP | 3775250 B2 | 5/2006 |
| JP | 2006130691 A | 5/2006 |
| JP | 2006-182009 A | 7/2006 |
| JP | 2006-240948 A | 9/2006 |
| JP | 2006248885 A | 9/2006 |
| JP | 2006-327711 A | 12/2006 |
| JP | 2007021548 A | 2/2007 |
| JP | 2007-079514 A | 3/2007 |
| JP | 2007253203 A | 10/2007 |
| JP | 2008-132616 A | 6/2008 |
| JP | 2008-168327 A | 7/2008 |
| JP | 2009056482 A | 3/2009 |
| JP | 2009-082958 A | 4/2009 |
| JP | 2009-126779 A | 6/2009 |
| JP | 2009-142886 A | 7/2009 |
| JP | 2009-178725 A | 8/2009 |
| JP | 2009-255114 A | 11/2009 |
| JP | 2010017990 A | 1/2010 |
| JP | 2010-042424 A | 2/2010 |
| JP | 2010046761 A | 3/2010 |
| JP | 04592855 B2 | 12/2010 |
| JP | 2011-011212 A | 1/2011 |
| JP | 2011049398 A | 3/2011 |
| JP | 2011-512259 A | 4/2011 |
| JP | 04672689 B2 | 4/2011 |
| JP | 2011-517622 A | 6/2011 |
| JP | 2011-520748 | 7/2011 |
| JP | 2011-147943 A | 8/2011 |
| JP | 2011-240291 A | 12/2011 |
| JP | 04880820 B2 | 2/2012 |
| JP | 2012024782 A | 2/2012 |
| JP | 2012031018 A | 2/2012 |
| JP | 2012159749 A | 8/2012 |
| JP | 2012-521889 | 9/2012 |
| JP | 2012187618 A | 10/2012 |
| JP | 2012-232894 A | 11/2012 |
| JP | 2012-528772 A | 11/2012 |
| JP | 2013007842 A | 1/2013 |
| JP | 2013031879 A | 2/2013 |
| JP | 2013043808 A | 3/2013 |
| JP | 2013-063863 A | 4/2013 |
| JP | 2013075802 A | 4/2013 |
| JP | 2013091578 A | 5/2013 |
| JP | 2013-521131 A | 6/2013 |
| JP | 2013-132664 A | 7/2013 |
| JP | 2013-144613 A | 7/2013 |
| JP | 05274085 B2 | 8/2013 |
| JP | 2013-536081 A | 9/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| JP | 2014-033216 A | 2/2014 |
| JP | 2014-037006 A | 2/2014 |
| JP | 2014033218 A | 2/2014 |
| JP | 2014-117707 A | 6/2014 |
| JP | 2015-030040 A | 2/2015 |
| JP | 2015-508189 A | 3/2015 |
| JP | 2015-076115 A | 4/2015 |
| JP | 2015-091606 A | 5/2015 |
| JP | 2015-536896 A | 12/2015 |
| JP | 2016-520501 A | 7/2016 |
| KR | 10-2000-0071829 A | 11/2000 |
| KR | 2009057161 A | 6/2009 |
| KR | 2010-0120297 A | 11/2010 |
| KR | 10-2011-0001948 A | 1/2011 |
| KR | 1020621 B1 | 3/2011 |
| KR | 2012015366 A | 2/2012 |
| KR | 2012074508 A | 7/2012 |
| KR | 2013-0031377 A | 3/2013 |
| KR | 2013031380 A | 3/2013 |
| KR | 1269474 B1 | 5/2013 |
| KR | 20130061897 A | 6/2013 |
| KR | 10-2013-0075651 A | 7/2013 |
| KR | 2013124646 A | 11/2013 |
| KR | 10-2013-0135873 A | 12/2013 |
| KR | 10-2013-0140561 A | 12/2013 |
| KR | 1344368 B1 | 12/2013 |
| KR | 2014022980 A | 2/2014 |
| KR | 2014022981 A | 2/2014 |
| KR | 1020140064220 A | 5/2014 |
| KR | 10-2015-0009153 A | 1/2015 |
| KR | 10-2015-0082638 A | 7/2015 |
| KR | 2015-0087369 A | 7/2015 |
| TW | 1323203 B | 4/2010 |
| TW | 201107253 A | 3/2011 |
| TW | I362370 B | 4/2012 |
| TW | 201226345 A | 7/2012 |
| TW | 201433550 A | 9/2014 |
| TW | 201436968 A | 10/2014 |
| TW | I468354 B | 1/2015 |
| TW | I520804 B | 2/2016 |
| WO | 1999029243 A1 | 6/1999 |
| WO | 1999063900 | 12/1999 |
| WO | 02/39063 A1 | 5/2002 |
| WO | 2002060633 A1 | 8/2002 |
| WO | 2003/007370 A1 | 1/2003 |
| WO | 2004110693 A1 | 12/2004 |
| WO | 2006073098 A1 | 7/2006 |
| WO | 2007094160 A1 | 8/2007 |
| WO | 2007/108589 A1 | 9/2007 |
| WO | 2008080182 A1 | 7/2008 |
| WO | 2008/126742 A1 | 10/2008 |
| WO | 2008128612 A1 | 10/2008 |
| WO | 2009/012913 A1 | 1/2009 |
| WO | 2009/114372 A2 | 9/2009 |
| WO | 2009114375 A2 | 9/2009 |
| WO | 2009/119694 A1 | 10/2009 |
| WO | 2011056781 A1 | 5/2011 |
| WO | 2010035736 A2 | 1/2012 |
| WO | 2012006736 A2 | 1/2012 |
| WO | 2012166753 A2 | 6/2012 |
| WO | 2012108052 A1 | 8/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014/012125 A1 | 1/2014 |
| WO | 2014/075995 A2 | 5/2014 |
| WO | 2014/079570 A1 | 5/2014 |
| WO | 2014064492 A1 | 5/2014 |
| WO | 2014079478 A1 | 5/2014 |
| WO | 2014/132493 A1 | 9/2014 |
| WO | 2015/050762 A1 | 4/2015 |
| WO | 2015/095088 A1 | 6/2015 |
| WO | 2015/095090 A1 | 6/2015 |
| WO | 2015/114032 A1 | 8/2015 |
| WO | 2015/128833 A1 | 9/2015 |

(56) References Cited

FOREIGN PATENT DOCUMENTS

| WO | 2015/132008 A1 | 9/2015 |
| WO | 2015127583 A1 | 9/2015 |
| WO | 2016/007843 A1 | 1/2016 |
| WO | 2016/010991 A1 | 1/2016 |
| WO | 2016005455 A1 | 1/2016 |
| WO | 2016010954 A2 | 1/2016 |
| WO | 2016154284 A1 | 9/2016 |
| WO | 2017/009149 A1 | 1/2017 |
| WO | 2017/079570 A2 | 5/2017 |
| WO | 2017/091529 A1 | 6/2017 |
| WO | 2017/093393 A1 | 6/2017 |

OTHER PUBLICATIONS

Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers", Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. Of SPIE vol. 8967 896711-1 (2014).
Wang et al., "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.

Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
"What is the difference between Ra and RMS?"; Harrison Electropolishing LP; (http://www.harrisonep.com/electropolishingra.html), Accessed Aug. 8, 2016.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. Of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf ; archived on Oct. 6, 2013).
Chiao et al. 9. "Self-trapping of optical beams," Phys. Rev. Lett, vol. 13, No. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.

(56)             References Cited

OTHER PUBLICATIONS

Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.

Cubeddu et al., "Compact tissue oximeter based on dual-wavelength multichannel time-resolved reflectance"; Applied Optics, vol. 38, No. 16, Jun. 1, 1999, pp. 3670-3680.

Ding et al., "High-resolution optical coherence tomography over a large depth range with an axicon lens"; Optic Letters, vol. 27, No. 4, pp. 243-245, Feb. 15, 2002, Optical Society of America.

Dong et al. "On-axis irradiance distribution of axicons illuminated by spherical wave", Optics & Laser Technology 39 (2007) 1258-1261.

Duocastella et al. "Bessel and annular beams for material processing", Laser Photonics Rev. 6, 607-621, 2012.

Durnin. "Exact solutions for nondiffracting beams I. The scaler theory" J. Opt. Soc. Am. A. 4(4) pp. 651-654.

Eaton et al. "Heat accumulation effects in femtosecond laser written waveguides with variable repetition rates", Opt. Exp. 5280, vol. 14, No. 23, Jun. 2006.

Gattass et al. "Micromachining of bulk glass with bursts of femtosecond laser pulses at variable repetition rates" Opt. Exp. 5280, vol. 14, No. 23, Jun. 2006.

Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.

Golub, I., "Fresnel axicon"; Optic Letters, vol. 31, No. 12, Jun. 15, 2006, Optical Society of America, pp. 1890-1892.

Gori et al. "Analytical derivation of the optimum triplicator" Optics Communications 157 (1998) pp. 13-16.

Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.

Honda et al. "A Novel Polymer Film that Controls Light Transmission", Progress in Pacific Polymer Science 3, 159-169 (1994). http://www.gtat.com/Collateral/Documents/English-US/Sapphire/12-21-12_GT_TouchScreen_V3_web.pdf.

Hu et al. "5-axis laser cutting interference detection and correction based on STL model" (2009) Zhongguo Jiguang/Chinese Journal of Lasers, 36 (12), pp. 3313-3317.

Huang et al., "Laser etching of glass substrates by 1064 nm laser irradiation", Applied Physics, Oct. 2008, vol. 93, Issue 1, pp. 159-162.

Juodkazis S. et al. Laser induced microexplosion confined in the bulk of a sapphire crystal: evidence of multimegabar pressures., Phys. Rev. Lett. 96, 166101, 2006.

Karlsson et al. "The technology of chemical glass strengthening—a review" Glass Technol: Eur. J. Glass Sci. Technol. A (2010) 51 (2) pp. 41-54.

Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.

Kruger et al., "Femtosecond-pulse visible laser processing of transparent materials"; Applied Surface Science 96-98 (1996) 430-438.

Kruger et al., "Laser micromachining of barium aluminium borosilicate glass with pluse durations between 20 fs and 3 ps"; Applied Surface Science 127-129 (1998) 892-898.

Kruger et al., "Structuring of dielectric and metallic materials with ultrashort laser pulses between 20 fs and 3 ps"; SPIE vol. 2991, 0277-786X/97, pp. 40-47.

Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.

Levy et al. "Design, fabrication, and characterization of circular Dammann gratings based on grayscale lithography," Opt. Lett vol. 35, No. 6, p. 880-882 (2010).

Liu X et al. "laser ablation and micromachining with ultrashort laser pulses", IEEE J. Quantum Electronics, 22, 1706-1716, 1997.

Maeda et al. "Optical performance of angle-dependent light-control glass", Proc. SPIE 1536, Optical Materials Technology for Energy Efficiency and Solar Energy Conversion X, 138 (Dec. 1, 1991).

Mbise et al. "Angular selective window coatings: theory and experiments" J. Phys. D: Appl. Phys. 30 2103 (1997).

Betriebsanleitung TruMicro Series 5000, "Ausgabe May 2008 Betriebsanleitung TruMicro Series 5000_Anlage E2a-1.pdf".

Case study: Simulation einer Beschneidung des Fernfelds eines Bessel-Gauβ-Strahls GMvP6 p. 1.

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

Faccio et al. "Kerr-induced spontaneous Bessel beam formation in the regime of strong two-photon absorption" Optics Express 16(11) 2008, pp. 8213-8218.

Flamm et al., "Higher-order Bessel-like Beams for Optimized Ultrafast Processing of Transparent Materials" GMvP 19.

Flamm et al., "Higher-order Bessel-like Beams for Optimized Ultrafast Processing of Transparent Materials" GMvP 20.

High aspect ratio machining . . . Anlage E8-1.pdf.

Kerr. "Filamentary tracks formed in transparent optical glass by laser beam self-focusing. II. Theoretical Analysis" Physical Review A., 4(3) 1971, pp. 1196-1218.

Louis A. Romero* and Fred M. Dickey, "Theory of optimal beam splitting by phase gratings. I. One-dimensional gratings" J. Opt. Soc. Am., A 24, 2280, (2007).

Merkmalsgliederung Patentanspruch 1 des Streitpatents, "Merkmalsgliederung Patentanspruch 1_Anlage E15-1.pd1".

Merkmalsgliederung Patentanspruch 12 des Streitpatents, "Merkmalsgliederung Patentanspruch 12_Anlage E16-1.pdf".

Norm: DIN EN ISO 11146-2, 2005 DIN EN ISO 11146-2 May 2, 2005 GMvP 21 pages.

Norm: DIN EN ISO 11146-1, 2005 GMvP DIN EN ISO 11146:1999-09 Apr. 1, 2005 GMvP 23 pages.

Norm: ISO/TR 11146-3 , Technical Report First edition GMvP Norm-TR 1 Pages.

Polesana (Polesana, P., Dubietis, A., Porras, A. Kucinskas, E. Faccio, D. Couairon, A. and DiTrapani, P.,, "Near-field dynamics of ultrashort pulsed Bessel beams in media with Kerr nonlinearity", Physical Review E 73, 056612 (2006).

Product Data Sheet for Corning Eagle XG Slim Glass, Issued Aug. 2013; 2 Pages.

Product data sheet for Corning Eagle XR glass substrate, issued Jan. 2006 (Year: 2006).

Produktbeschreibung Pharos Laser vom Apr. 18, 2011, "Pharos_2011 Anlage E 1 a-1. pdf".

Sukumaran, "Design, Fabrication, and Characterization of Ultrathin 3-D Glass Interposers with Through-Package-Vias at Same Pitch as TSVs in Silicon." IEEE Transactions on Components, Packaging and Manufacturing Technology, vol. 4, No. 5: 786-795, (2014.).

Sukumaran, "Through-Package-Via Formation and Metallization of Glass Interposers.", Electronic Components and Technology Conference: 557-563, (2010.).

Tymon Barwicz, et al., "Assembly of Mechanically Compliant Interfaces between Optical Fibers and Nanophotonic Chips", Tymon Barwicz (IBM), et al., Electronic Components & Technology Conference, 2014,. 978-1799-2407-3, 2014 IEEE, pp. 179-185.

ICNIRP, Infrared Radiation, https://www.icnirp.org/en/frequencies/infrared/index.html#:~:text=Wavelength, accessed Apr. 7, 2021 (Year: 2014).

Liu,Xiuwen, "Graphical Audio-Visual Technology Tips", Apr. 30, 2006, pp. 58-59. (Original Document Only).

(56) References Cited

OTHER PUBLICATIONS

Tian e al., "Development status and Prospects of TFT-LCD Substrate Glass Chemical Composition", vol. 29, No. 6, 2010, pp. 1348-1362 (English Abstract Submitted).

Tsai et al. ,"Internal modification for cutting transparent glass using femtosecond Bessel beams", Optical Engineering, Soc. of Photo-optical Instrumentation Engineering, Bellingham, vol. 53, May 2014, p. 51503.

Chinese Patent Application No. 201780065972.0, Office Action dated Apr. 15, 2022, 14 pages (6 pages of English Translation and 8 pages of Original Document), Chinese Patent Office.

Chinese Office action for patent application No. 201610255377.0, dated Apr. 3, 2019, 11 pages.

Japanese Office action for patent application No. 2018-516757, dated Aug. 4, 2021, 12 pages.

Japanese Office action for patent application No. 2018-516757, dated Dec. 1, 2021, 7 pages.

Korean Office action for patent application No. 10-2018-7012424, dated Jan. 27, 2023, 6 pages.

Japanese Office action for patent application No. 2018-516757, dated Sep. 9, 2020, 8 pages.

Chinese Office action for patent application No. 201610255377.0, dated Nov. 5, 2019, 6 pages.

* cited by examiner

METHOD AND DEVICE FOR LASER PROCESSING OF TRANSPARENT MATERIALS

CROSS REFERENCE TO RELATED APPLICATION

This application claims the benefit of priority under 35 U.S.C. § 371 of International Application No. PCT/EP2016/073460, filed on Sep. 30, 2016, which claims the benefit of priority to Lithuanian Application No. 2015085 filed on Oct. 2, 2015, the content of which is incorporated herein by reference in its entirety.

TECHNICAL FIELD

Invention relates to the laser field and namely to processing of transparent materials and can be used for cutting, breaking and other processing procedures of transparent materials, including glass, chemically tempered glass, sapphire and other crystalline materials, by the use of ultrashort pulse asymmetric Gauss-Bessel intensity distribution laser beam.

BACKGROUND

Most of the methods and devices for cutting, scribing or breaking transparent materials are based on focusing of the laser beam generated by the laser source on the surface or in the bulk of the transparent materials, forming a crack in the transparent material, which causes the transparent material to separate or break due to effect of external force.

An international patent application WO2012006736 discloses a method for pre-cutting of a transparent material, which comprises the steps of: directing ultrashort pulse laser beam to a workpiece and focusing within it, wherein the material of the workpiece is transparent to the focused laser beam. The laser pulse duration and energy are selected to form a thread-like damage region (filament) that extends through the workpiece along the beam propagation direction. The workpiece is selectively translated relative to the focused laser beam to define a trajectory for cutting the workpiece or separating a part from the workpiece.

A similar method and apparatus for processing of transparent materials is described in an international patent application WO 2014/079478 A1. A method for processing transparent materials that employs ultrashort pulse Gaussian intensity distribution laser beam is described. The method comprises the following sequence of operations: directing an ultrashort pulse Gaussian intensity distribution laser beam to an optical system, forming Gauss-Bessel intensity distribution laser beam, which is directed and localized in the workpiece by optical elements. The material of the workpiece is transparent to the localized Gauss-Bessel intensity distribution laser beam, and the laser pulse duration and energy are selected to exceed the optical damage threshold of the workpiece material and to form a damage region, consisting of micro cracks, which extends across the workpiece along the propagation direction of the focused laser beam. Displacement of the workpiece relative to the focused laser beam permits formation of additional damage regions, forming a trajectory of a cutting/breaking plane.

Devices for processing transparent materials that employ a single pulse of Gaussian or Gauss-Bessel laser beam to penetrate a partial or full thickness of the workpiece are known. Known methods and devices localize a Gauss-Bessel intensity distribution laser beam in a transparent workpiece to form a damage region that extends in the direction of propagation of the laser beam. The damage region has a circular shape in a plane perpendicular to the direction of laser beam propagation. A succession of damage regions having a circular shape define a trajectory of a cut and/or break plane. Such a cut and/or break plane formed in the workpiece, consisting of damage regions that have a shape close to a circle, creates stress and cracks of random direction or even several directions in the bulk and on the surface of the workpiece in respect to the trajectory of cut and/or break plane. This negatively influences the cut and/or break quality, especially when the cut and/or break plane trajectory is comprised of various radius curves. Formation of random cracks and stresses in the bulk and surface of the workpiece in directions away from the intended cut trajectory also reduces the mechanical strength of the processed workpiece, which leads to defective parts, greater consumption of the workpiece material, and less efficient processes.

SUMMARY

According to a first aspect of the invention there is provided a method of processing transparent materials including the steps of: generating a Gauss-Bessel intensity profile laser beam in an optical system, localizing the generated Gauss-Bessel intensity profile laser beam in a workpiece (7), wherein the material of the workpiece is transparent to the Gauss-Bessel intensity profile laser beam, to form a damage region in the workpiece, the damage region extending in the direction of propagation of the laser beam, performing controlled displacement of the workpiece (7) and the laser beam in respect to each other to create a required number of additional adjacent damage regions in a predefined trajectory in order to form a cutting and/or breaking plane of the workpiece (7), characterized in that: generating a Gauss-Bessel intensity profile laser beam comprises generating an asymmetric Gauss-Bessel intensity profile laser beam (6b) by placing an optical element (3, 3', 3") in the optical path of the beam, wherein asymmetry of the asymmetric Gauss-Bessel intensity profile laser beam is set by selecting appropriate material of the optical element (3, 3', 3") and/or parameters of the optical element (3, 3', 3") and/or position of the optical element (3, 3', 3") in the optical laser beam path in order to form elongated shape of the Gauss-Bessel intensity profile laser beam in the plane, perpendicular to the direction of propagation of the laser beam, inducing correspondingly an elongated damage region (18b) in the workpiece (7), and wherein the controlled displacement of the workpiece (7) and the laser beam relative to each other is performed in such a manner that the induced elongated shape damage regions (18b) are arranged in the workpiece (7) longitudinally one after other along the predefined trajectory of the cutting and/or breaking plane.

In another aspect, there is provided a method of processing transparent materials including the steps of: directing ultrashort pulse Gaussian intensity profile laser beam (2) from the laser source (1) to an optical system, generating Gauss-Bessel intensity profile laser beam, localizing generated Gauss-Bessel intensity profile laser beam in a workpiece (7), wherein the material of the workpiece is transparent to the localized Gauss-Bessel intensity profile laser beam and, wherein a laser pulse duration and a laser pulse energy of the directed laser beam (2) are selected to exceed material damage threshold of the workpiece (7) and to form in the workpiece a damage region, which extends in the direction of propagation of the laser beam, performing controlled displacement of the workpiece (7) and the laser beam with respect to each other to create a required number of additional adjacent damage regions in a predefined trajectory in order to form a cutting and/or breaking plane of the workpiece (7), characterized by transforming the ultra-short pulse Gaussian intensity profile laser beam (2) to asymmetric Gauss-Bessel intensity profile laser beam (6b) by placing an optical element (3, 3', 3") in the optical path of the Gaussian or Gauss-Bessel intensity profile laser beam, wherein asymmetry of the asymmetric Gauss-Bessel intensity profile laser beam is set by selecting appropriate material of the optical element (3, 3', 3") and/or parameters of the optical element (3, 3', 3") and/or position of the optical element (3, 3', 3") in the optical laser beam path in order to form elongated shape of the Gauss-Bessel intensity profile laser beam in the plane, perpendicular to the direction of propagation of the laser beam, inducing correspondingly an elongated damage region (18b) in the workpiece (7), and wherein the controlled displacement of the workpiece (7) and the laser beam relative to each other is performed in such a manner that the induced elongated shape damage regions (18b) are arranged in the workpiece (7) longitudinally one after the other along the predefined trajectory of the cutting and/or breaking plane.

The elongated shape of the induced damage region in the plane perpendicular to the laser beam propagation direction may be similar to the shape of an ellipse.

The elongated shape damage regions may be positioned at a certain distance one from another within the workpiece along the trajectory of the cutting and/or breaking plane, so that the distance dx between the centers of the adjacent damage regions is in the range from about 0.5 to about 15 lengths of a single damage region (18b), where the length of a damage region along the longer axis (18e) is from about 1 μm to about 20 μm, and the length of the damage region along the longer axis is from 1.3 to 5 times, preferably 2 times, larger than the length along the shorter axis. The transparent material of the workpiece is selected from the group consisting of glass, chemically strengthened glass, sapphire or other crystalline material.

The length of the damage region induced in the transparent workpiece along the laser beam propagation direction may be shorter than the thickness of the plate-like workpiece and not be adjoined to any of the surfaces of the plate-like workpiece, or the length of the damage region may coincide with the thickness of the workpiece and be adjoined to both of the surfaces of the plate-like workpiece, or the length of the damage region may be shorter than the thickness of the plate-like workpiece and adjoined to only one of the surfaces.

The transparent material of the workpiece may be glass (including for example thermally strengthened glass), chemically strengthened glass, sapphire or other crystalline material.

According to a further aspect of the invention there is provided a device for processing transparent materials.

In a yet further aspect, there is provided a device for processing transparent materials.

The optical element may be a transparent plate, that is placed in the optical path of the Gaussian or Gauss-Bessel intensity profile laser beam in such a manner, that it covers half of the laser beam, where the covered and uncovered parts of the laser beam are symmetrical, and the uncovered part of the beam passes directly, whereas the covered part of the beam passes through the transparent plate.

The optical element may be a transparent plate having a first zone and a second zone of different thickness, which is placed in the optical path of the Gaussian or Gauss-Bessel intensity profile laser beam in such a manner, that the laser beam is split in to two parts, where the first part of the beam passes through the first zone of the plate and the second part of the beam passes through the second zone of the plate. The two parts may be equal symmetric parts.

The optical element may be a transparent plate having a first zone and a second zone of different refractive index, which is placed in the optical path of the Gaussian or Gauss-Bessel intensity profile laser beam in such a manner, that the aforementioned beam is split in to two parts, where the first part of the beam passes through the first zone of the plate and the second part of the beam passes through the second zone of the plate. The two parts May be equal symmetric parts.

The controlled positioning mechanism may comprise a rotary stage, to which the optical is attached, and a linearly movable stage, to which the workpiece is attached, wherein the stages may be controlled by the controller, which receives commands from a computer according to a predefined trajectory of the cutting and/or breaking plane in such a manner, that the direction of trajectory of the cut and/or break plane is controlled by the stage, rotating the optical element, and the positioning of the damage regions in the workpiece at a certain displacement distance is controlled by stage linearly moving the workpiece.

The positioning mechanism may comprise a Dove prism, placed in the optical path of the Gaussian or Gauss-Bessel intensity profile laser beam behind the stationary optical element and attached to the rotary stage, and the linear motion stage, to which the workpiece is attached, wherein rotary and linear motion stages are controlled by controller, which receives commands from computer according to predefined trajectory of the cutting and/or breaking plane in such a manner, that the direction of trajectory of the cut and/or break plane is controlled by stage rotating Dove prism, and the positioning of the damage regions in the workpiece at a certain displacement distance is controlled by stage linearly moving the workpiece.

A quarter wave phase plate for changing polarization state of the laser radiation of the laser source from linear to circular, may be placed in the laser beam path in front of or behind the optical element and in front of the Dove prism along the direction of the laser beam propagation.

A half wave phase plate for maintaining the same polarization state of the laser radiation of the laser source may be placed in the laser beam path behind the optical element and in front of the Dove prism according to the direction of the laser beam propagation and attached to the stage for rotating phase plate together with the Dove prism.

The proposed method and a device for processing of transparent materials results in the formation of damage regions in a workpiece that have an elongated (asymmetric) shape in the direction of laser beam propagation and in the plane perpendicular to the direction of laser beam propagation. The direction and distance between damage regions formed in the workpiece by the laser is controlled by a positioning mechanism that positions the elongated (asymmetric) damage regions in succession at the controlled locations along the trajectory of the cut and/or break plane needed to form a required cut and/or break in the workpiece. The elongated damage regions induced in the workpiece preferably have a shape similar to an ellipse. Such elongated damage regions will result in a crack propagating within the damage region along the lengthwise dimension of the damage region. According to the proposed method and device, formation of the breaking and/or cutting plane with elongated damage regions affords control of the direction of stress or crack formation in the workpiece to preferentially form stress or cracks along the cut trajectory to minimize or avoid cracks and stress in random directions in the bulk or surface of workpiece away from the cut trajectory.

In some embodiments, this may result in significantly improved processing quality of the transparent materials, improved workpiece material yield, processing throughput and processing speed of free form plate-like transparent material workpieces. Processing quality, throughput and processing speed may improve due to elongation of the damage region and due to an orderly arrangement of micro cracks along the trajectory of the cut and/or break plane, due to orderly guidance of the micro cracks and the size of them.

18b—is a damage region with cracks induced in the bulk of the transparent material workpiece by asymmetric Gauss-Bessel intensity profile laser beam (there is an optical element in the optical path of the laser beam, which transforms it to asymmetric Gauss-Bessel intensity profile laser beam).

Figure 6:
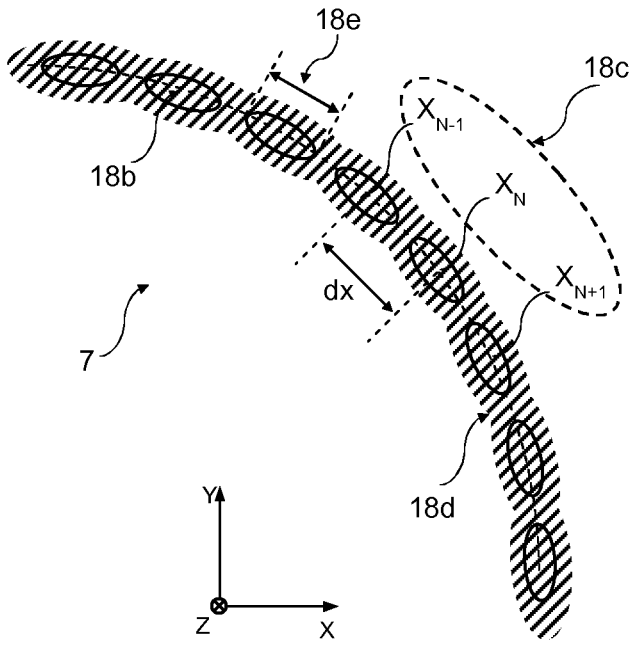

FIG. 6 is a schematic drawing illustrating laser induced modifications of elongated shape, similar to the shape of an ellipse, displaced one after another longitudinally along cut and/or break plane trajectory.

Figure 7:
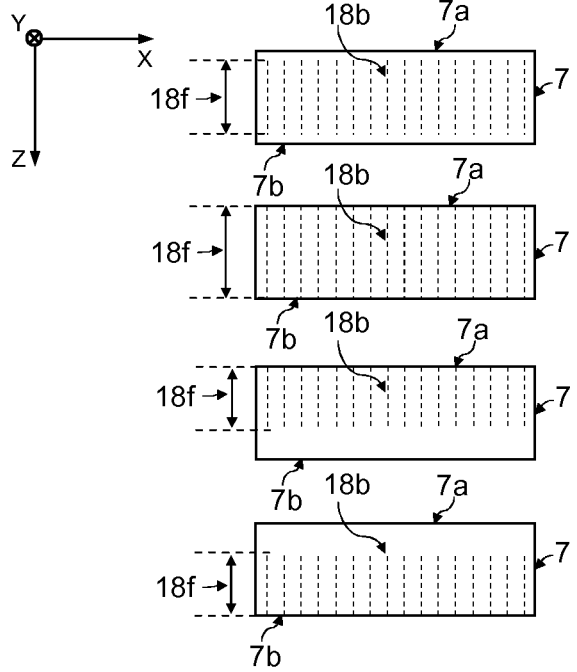

FIG. 7 is a collection of four alternative embodiments of length 18f and allocation of damage regions induced in the bulk of transparent material workpiece.

Figure 8:
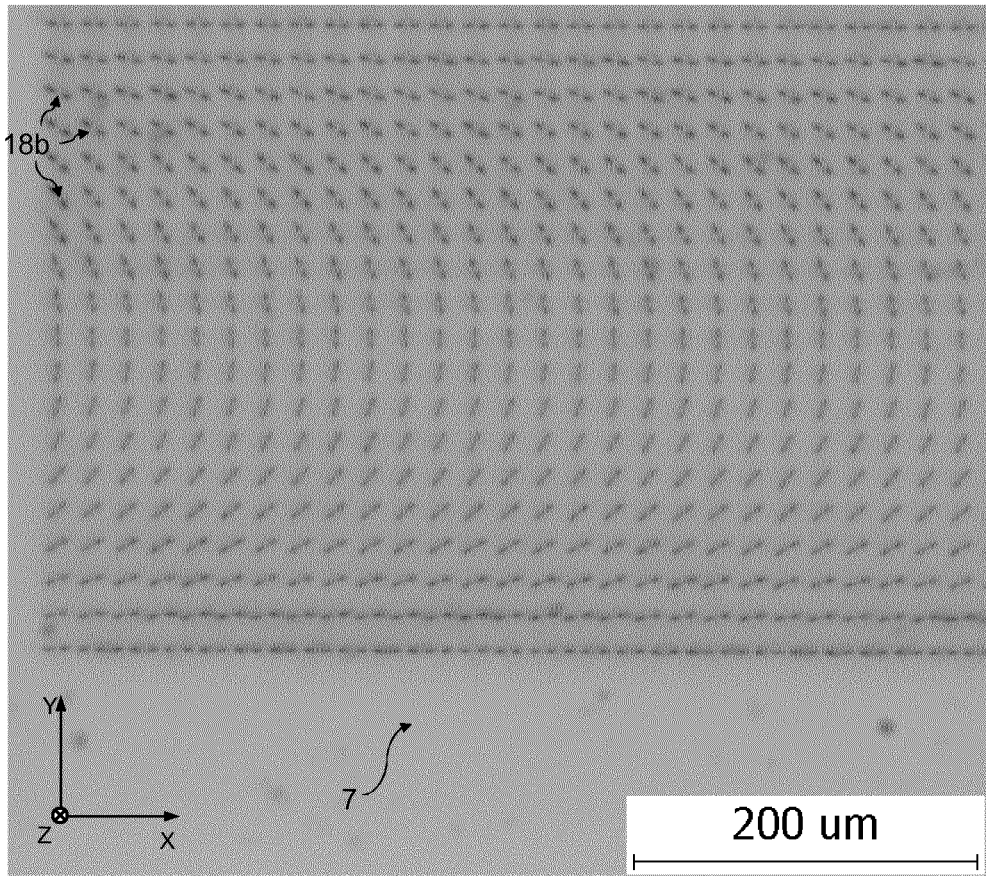

FIG. 8 is a photograph of damage regions induced in the bulk of transparent material workpiece, illustrating control over crack direction by a rotation of optical element.

DETAILED DESCRIPTION OF

Referring to the figures, a device for laser processing of transparent materials, comprises:

a laser source 1, generating ultrashort pulse Gaussian intensity profile laser beam 2, an optical element (3, 3', 3"), transforming Gauss-Bessel intensity profile ultrashort pulse laser beam to asymmetric Gauss-Bessel intensity profile laser beam, a controlled rotation device (4a, 4b), directing damage region 18b along the desired direction within the workpiece 7, while forming cutting and/or breaking plane trajectory, an optical system 5, forming Gauss-Bessel intensity profile laser beam and localizing it within the workpiece 7 which is transparent to the localized laser beam, a stage 8, which is capable of linear motion, controlled by controller 10, which receives control commands from computer 9, a beam generating optical element 11 generating Gauss-Bessel intensity profile laser beam, such as spatial light modulator, conical lens (axicon), a setup of optical components 12, 13, localizing Gauss-Bessel intensity profile laser beam in the bulk of the workpiece 7, a transparent plate 14a, for performing the function of the optical element (3, 3', 3"), a transparent plate 14b that comprises two zones of different thickness, for performing the function of the optical element (3, 3', 3"), a transparent plate 14c that comprises two zones of different refractive index, for performing the function of the optical element (3, 3', 3"), a stage (15, 15', 15") capable of rotation motion, for rotation of optical element (3, 3', 3") or Dove prism (16, 16').

An optical setup 19 for formation of asymmetric Gauss-Bessel intensity profile laser beam includes the optical element (3,3',3"), controlled rotation device (4a,4b) and the optical system (5).

Figure 1:
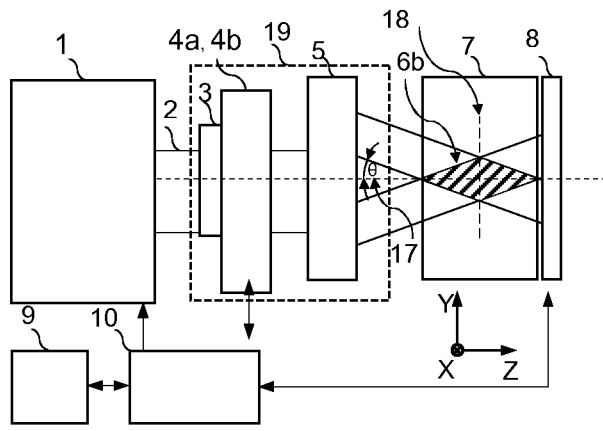
FIG. 1 is a principal block scheme of the proposed device for processing of transparent materials.

FIG. 1 is a principal block schematic of a proposed device for processing of transparent materials. The material of the plate-shaped workpiece is transparent to laser radiation 2 of the laser source 1.

In some embodiments, suitable laser wavelengths for forming damage regions are wavelengths at which the combined losses due to absorption and scattering by the workpiece at the wavelength are less than 20%/mm, or less than 15%/mm, or less than 10%/mm, or less than 5%/mm, or less than 1%/mm, where the dimension "/mm" means per millimeter of distance within the workpiece in the direction of propagation of the laser beam. When the workpiece is transparent to the laser wavelength, transfer of energy from the laser to the workpiece may occur primarily through non-linear processes that are enabled by the high intensity of the ultrashort pulse radiation. Non-linear processes include multi-photon processes such as two-photon absorption.

The method is realized by selecting the optical setup 19 for formation of an asymmetric Gauss-Bessel intensity profile laser beam and by selecting parameters of laser radiation so that the interaction of pulsed asymmetric Gauss-Bessel intensity profile laser beam 6b with the material of the workpiece 7 induces a damage region 18b in the workpiece material, which has a shape that is elongated (asymmetric) in laser beam propagation direction and in the plane perpendicular to the direction of laser beam propagation. The number and positioning of the induced damage regions 18b longitudinally forming a succession of damage regions 18c is controlled by the controller 10 commanded by the computer 9 to displace the workpiece 7 and the asymmetric Gauss-Bessel intensity profile laser beam, with with respect to each other. The induced elongated damage regions 18b interconnect along the trajectory via micro-cracking planes that are induced due to the buildup of inner stress in the surroundings of the damage region to a breaking plane 18d. The size and magnitude of damage regions 18b within the workpiece material is controlled via the selection of pulsed laser beam characteristics, such as laser pulse duration, average laser pulse energy, laser wavelength and Gauss-Bessel intensity profile laser beam cone angle. Typical length of a damage region 18b along the longer axis 18e, in the plane perpendicular to laser beam propagation direction, is from about 1 µm to about 20 µm, and the length of the damage region along the longer axis is from 1.3 to 5 times, preferably 2 times, larger than the length along the shorter axis, depending on the workpiece material type, thickness and layered structure if one has such.

The method is realized by an ultrashort pulse laser, which has a pulse duration in the range of about 1 ps to 100 ps, such as in the range from 10 ps to 100 ps. An average laser pulse energy measured at the workpiece material, is set to be less than about 1000 µJ, such as less than about 400 µJ. The wavelength of the laser source is selected so that the energy of a single photon of that laser wavelength is less than the band gap of the workpiece material, and less than about 3 µm. The optical setup 19 is such that half of the cone angle 17 of the Gauss-Bessel intensity profile laser beam is in the range from 4 to 45 degrees, for example in the range from 4 to 20 degrees. By translating the plate-shaped workpiece 7 and asymmetric Gauss-Bessel intensity profile laser beam 6b, having an elongated shape similar to an ellipse in the plane perpendicular to the beam propagation direction, relative to each other, subsequent modifications are displaced longitudinally along the cutting and/or breaking plane trajectory by a certain distance dx, which can be in the range from 0.5 to 15 multiplied by the length of the single damage region along the longer axis 18e, depending on type of the workpiece material, thickness and layered structure if applicable.

The characteristics of the optical setup 5 and the laser beam 2 are selected such that the interaction of an asymmetric Gauss-Bessel intensity profile laser beam 6b, having an elongated shape similar to an ellipse in the plane perpendicular to the beam propagation direction, and the workpiece 7 material induces a damage region 18b along the laser beam propagation direction, where the length 18f of the damage region 18b is shorter than the thickness of the plate-shaped workpiece 7 and is not adjoined to any of the surfaces of the plate-shaped workpiece, or the length 18f of the damage region coincides with the thickness of the plate-shaped workpiece and is adjoined to both of the surfaces 7a, 7b of the plate-shaped workpiece, or the length 18f of the damage region is shorter than the thickness of the plate-shaped workpiece 7 and is adjoined to its front surface 7a, or the length 18f of the damage region is shorter than the thickness of the plate-shaped workpiece 7 and is adjoined to its back surface 7b.

Figure 3A:
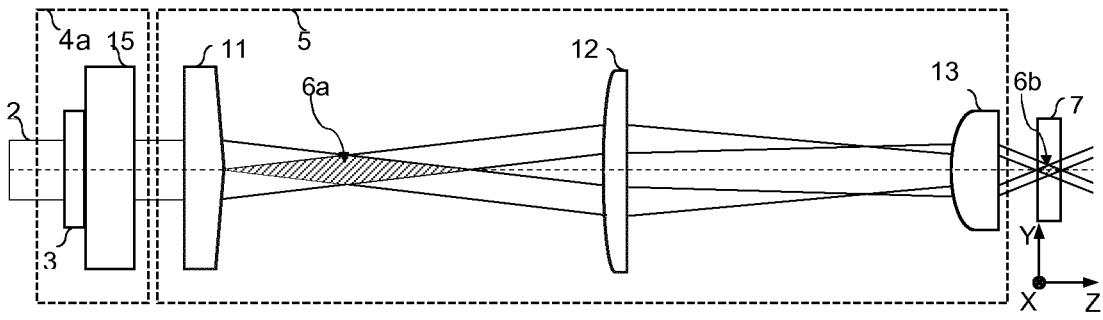
FIG. 3a is a principal optical layout of the proposed device, according to an embodiment where the optical element is attached to a rotary stage and located in the Gaussian intensity profile laser beam path behind the optics, forming the Gauss-Bessel intensity profile laser beam.

FIG. 3a is a principal optical layout of an embodiment of the method disclosed, where an ultrashort pulse laser 1 generated Gaussian intensity profile laser beam 2 is passed through an optical element 3 to disrupt the laser beam symmetry. The laser beam is further passed through a typical Bessel-Gauss beam generating optical element (e.g., the beam generating optical element 11), such as spatial light modulator or conical lens, to transform the laser beam to asymmetric Gauss-Bessel intensity profile laser beam, which has an elongated shape, similar to that of an ellipse, in the plane perpendicular to the direction of the laser beam propagation. The asymmetric Gauss-Bessel intensity profile laser beam profile can be altered by a laser beam imaging optical setup 12, 13 or just localized in the bulk of the workpiece 7. The interaction of asymmetric Gauss-Bessel intensity profile laser beam and workpiece material results in damage region 18b, that leads to induction of micro-crack plane in the material 18d along the cutting and/or breaking plane trajectory, direction of which is controlled by rotation device 4a, where optical element 3 is rotated by a rotary stage 15. Successive laser pulses $X_{N-1}$, $X_N$, $X_{N+1}$ 18c at a certain pulse to pulse distance are positioned within the material by the use of translation stages 8 and a rotary stage 15 and a controller 10, all of which get commands from a computer 9 according to a predetermined cutting and/or breaking plane trajectory. Alternatively, optical setup with or without the laser source 1 can be translated in respect to the workpiece to get the same effect.

Figure 3B:
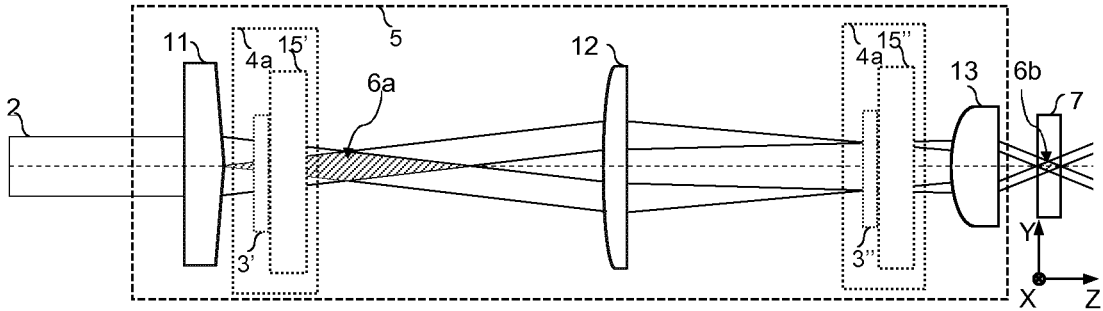
FIG. 3b is a principal optical layout of the proposed device, according to an embodiment where the optical element is attached to a rotary stage and located in the Gauss-Bessel intensity profile laser beam path (two alternative optical layouts are shown).

FIG. 3b is a principal optical layout of another embodiment of the method disclosed, that is based on the first embodiment. A controlled rotation device 4a, comprising optical element (36, 3") attached to a rotary stage (15', 15"), is used to set the direction of the crack of the damage region 6b in the workpiece 7 while inducing the cutting and/or breaking plane trajectory. The controlled rotation device 4a, is located in the optical path of the Gauss-Bessel intensity profile laser beam behind the beam generating optical element 11 in the direction of the laser beam propagation, which generates Gauss-Bessel intensity profile laser beam or alternatively located between optical elements 12 and 13.

Figure 4A:
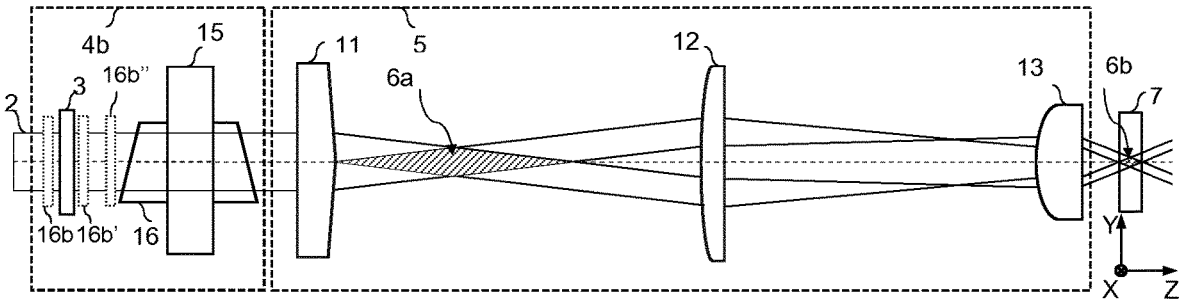
FIG. 4a is a principal optical layout of the proposed device, according to an embodiment where the stationary optical element is located in the optical path of the Gaussian intensity profile laser beam and behind it a Dove prism attached to a rotary stage is located.

FIG. 4a is a principal optical layout of yet another embodiment of the method disclosed, where optical layout 19 comprises a controlled rotation device 4b, which is located in the optical path of the Gaussian intensity profile beam 2 in front of optical setup 5, which is used to generate Gauss-Bessel intensity profile laser beam. Controlled rotation device 4b comprises optical element 3 and a Dove prism 16, which is attached to a rotary stage 15 behind a stationary optical element 3 in the direction of the laser beam propagation. Ultrashort pulse laser 1 generated Gaussian intensity profile laser beam 2 is passed through a beam symmetry disrupting optical element 3, that is in the optical path of the Gaussian intensity profile laser beam 2, and then is passed through a typical Bessel-Gauss intensity profile laser beam generating optical element (e.g., the beam generating optical element 11), such as spatial light modulator or conical lens. The resulting asymmetric Gauss-Bessel intensity profile laser beam can be altered by a laser beam imaging optical setup 12, 13 or just localized in the bulk of the workpiece 7. Interaction of the asymmetric Gauss-Bessel intensity profile laser beam and the workpiece material results in damage region 18b, that leads to induction of micro-crack plane trajectory in the material 18d, direction of which is controlled by rotating the image of the ultrashort pulse Gaussian intensity profile laser beam 2 passed through the optical element 3. This is realized by rotating the Dove prism 16 with the rotary stage 15. To overcome variations in reflection dependence on the Dove prism angle, if such arise, a quarter wavelength phase plate (16b, 16b') can be used to change the linear polarization of the laser radiation into circular, or a half wavelength phase plate 16b'' can be rotated together with the Dove prism 16 to maintain the same laser beam polarization state. Successive laser pulses $X_{N-1}$, $X_N$, $X_{N+1}$ 18c at a certain pulse to pulse distance are positioned within the material by the use of translation stages 8 and a rotary stage 15 and a controller 10, all of which get commands from a computer 9 according to a predetermined cutting and/or breaking plane trajectory. Alternatively, an optical setup with or without the laser source 1 can be translated with respect to the workpiece to get the same effect.

Figure 4B:
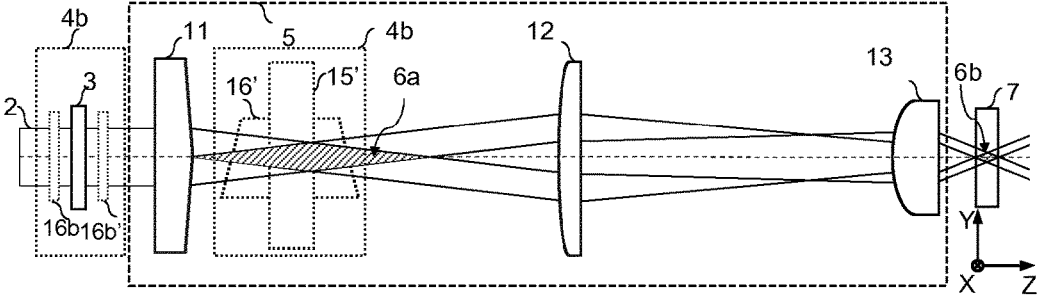
FIG. 4b is a principal optical layout of the proposed device, according to an embodiment where the stationary optical element is located in the optical path of the Gaussian intensity profile laser beam, and a Dove prism, attached to a rotary stage, is located in the optical path of the Gauss-Bessel intensity profile laser beam.
Figure 5:
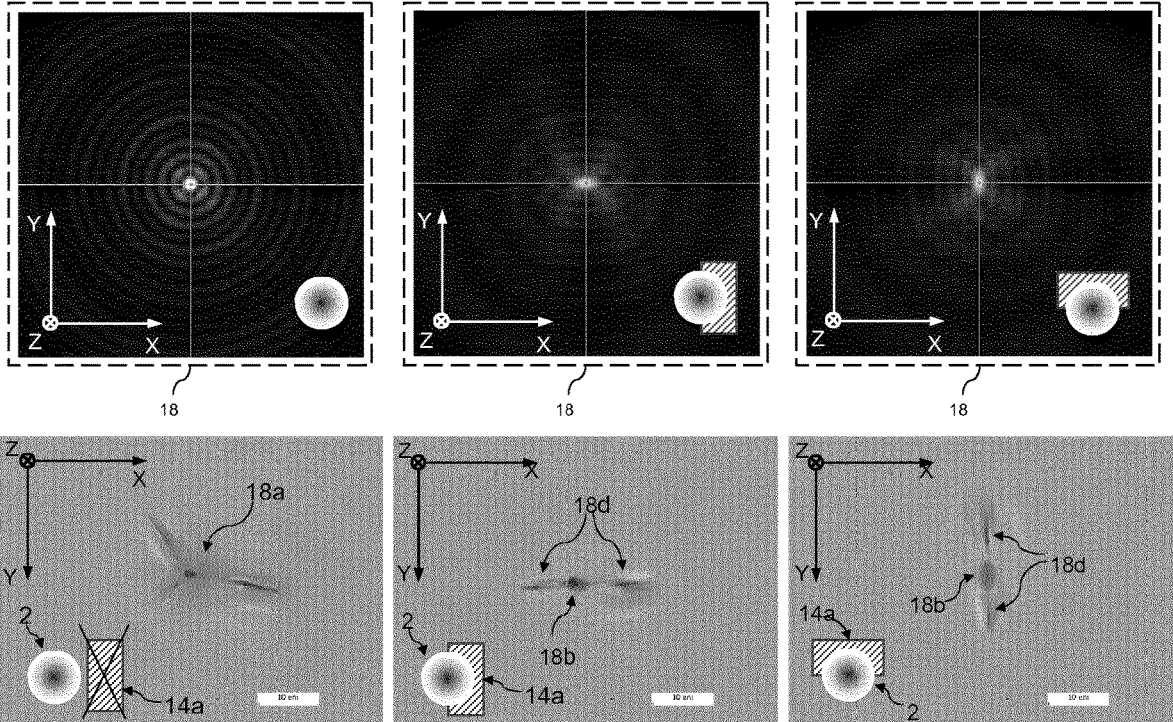
FIG. 5 is a collection of photos of damage regions: (top row) induced in the transparent material workpiece by symmetric and asymmetric Gauss-Bessel intensity profile laser beam (bottom row), where 18a—is a damage region surrounded by random direction cracks induced in the bulk of the transparent material workpiece by symmetric Gauss-Bessel intensity profile laser beam (there is no optical element in the optical path, which would transform the laser beam to asymmetric Gauss-Bessel intensity profile laser beam).

FIG. 4b is a principal optical layout of another embodiment of the method disclosed, that is based on the embodiment disclosed by the principal optical layout in FIG. 4a. In this embodiment the controlled rotation device 4b comprises stationary optical element 3, which is placed in the optical path of the Gaussian intensity profile laser beam 2, and behind it or in front of it a quarter wavelength phase plate (16b, 16b') can be placed, intended for changing linear polarization state of the laser radiation to circular. A Dove prism 16',is attached to a rotary stage 15' for setting the direction of the crack of the damage region 6b in the workpiece 7 while inducing the cutting and/or breaking plane trajectory. Dove prism 16' is located in the optical path of the Gauss-Bessel intensity profile laser beam behind the beam generating optical element 11 according to the direction of the laser beam propagation, which generates Gauss-Bessel intensity profile laser beam.

Figure 2:
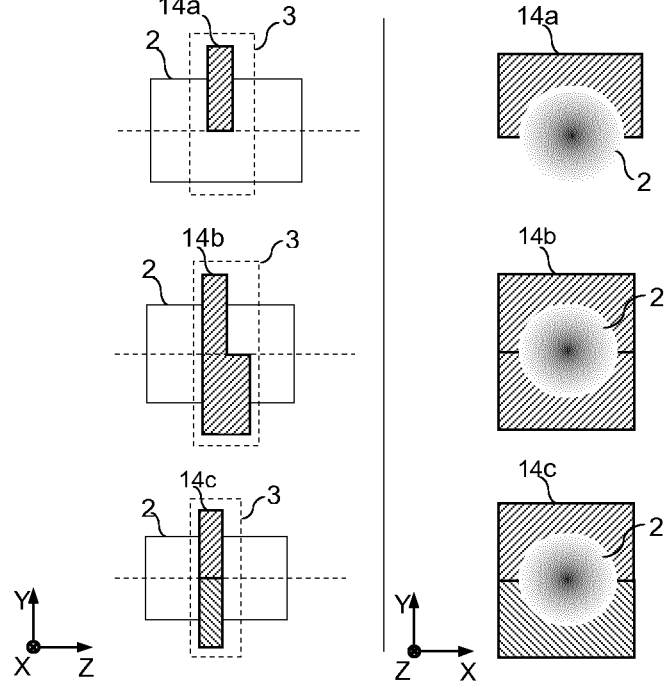
FIG. 2 is configuration and displacement of an optical element with respect to laser beam for disrupting symmetry of the intensity profile of the laser beam.

FIG. 2 shows some embodiments of optical element 3. Optical element 3 is a transparent material plate, material of which can be glass, crystal, or birefringent crystal, and/or having a layered structure influencing reflectivity, such as anti-reflecting coatings. The purpose of the optical element 3 in the embodiments of the proposed invention is to create asymmetry of the Gaussian or Gauss-Bessel intensity profile laser beam by introducing an additional optical path for a part of the laser beam. Due to an introduced asymmetry of the laser beam, the Gauss-Bessel intensity profile laser beam is transformed to an elongated, preferably having shape of an ellipse, Gauss-Bessel intensity profile laser beam 6b.

Optical element 3 can be realized using several technical solutions. Optical element 3 can be a glass plate 14a covering only a part of the laser beam. In an embodiment, the glass plate 14a is placed in the optical path of the Gaussian or Gauss-Bessel intensity profile laser beam in such a manner, that it covers half of the laser beam, where the covered and uncovered parts of the laser beam are symmetrical.

Due to aforementioned partial coverage of the laser beam by a glass plate 14a, an optical path difference is created between different parts of the laser beam and the symmetry of the intensity profile of the laser beam is disrupted. The thickness of the plate 14a is selected to transform Gauss-Bessel intensity profile laser beam to an asymmetric Gauss-Bessel intensity profile laser beam, such as 0.5 mm.

Another embodiment of optical element 3 is a transparent plate 14b, that comprises two zones of different thickness, and when placed in the optical path of the laser beam creates different optical path length to the parts of the laser beam that pass through the different zones. The two mentioned different thickness zones split the laser beam in to two equal symmetrical parts, where the first part of the beam passes through the first zone of the plate 14b and the second part of the beam passes through the second zone of the plate 14b.

Another embodiment of optical element 3 is a transparent plate 14c, that comprises two zones of different refractive index, and when placed in the optical path of the laser beam creates different optical path length to the parts of the laser beam that pass through the zones of different refractive index. Transparent plate 14c is placed in the optical path of the laser beam in such a manner, that the laser beam is split in to two equal symmetrical parts, where the first part of the beam passes through the first refractive index zone of the plate 14c and the second part of the beam passes through the second refractive index zone of the plate 14c.

According to other embodiments of the proposed invention the transparent plate (14a, 14b, 14c) can be placed in the optical path of the laser beam for partial coverage of the laser beam, splitting the beam to asymmetric parts and inducing damage regions of various shape, depending on the aforementioned asymmetry of the covered and uncovered laser beam parts.

According to embodiments of the proposed invention, the typical Gaussian intensity profile ultrashort pulse laser beam 2 may be transformed into an asymmetric Gauss-Bessel intensity profile laser beam, having an elongated shape in the plane perpendicular to laser beam propagation direction, and localized in the bulk of a transparent plate-shaped workpiece, where pulse energy is transferred to the workplace material via nonlinear processes and modification of the material takes place in a form of a damage region with micrometer size cracks. Due to a density change of the modified material in the damage region internal stress in the material forms a plane like micro-cracking, direction of which is controlled by rotation of the longer axis of the asymmetric/elongated Gauss-Bessel intensity profile laser beam. Inducing such modifications along a predefined trajectory creates a well-defined separation path, which is used to divide workpiece into parts of predefined shape by the mechanical force, thermal stress induced force or a timed self-break occurring due to inner stress present in the plate-shaped workpiece, depending on the plate-shaped workpiece type and layered structure.

The invention claimed is:

1. A device for processing a workpiece, comprising:

a laser source for generating a laser beam, an optical system, for forming a Gauss-Bessel laser beam having a Gauss-Bessel intensity profile from the laser beam and localizing the Gauss-Bessel laser beam in the workpiece to form a damage region in the workpiece along a beam propagation direction, wherein the workpiece is transparent to the Gauss-Bessel laser beam, a positioning mechanism comprising a first movable stage and a second movable stage controlled by a controller, wherein the first movable stage is coupled to the optical system and the second movable stage is coupled to the workpiece to displace the workpiece and the Gauss-Bessel laser beam with respect to each other, so that a plurality of damage regions are created in a predefined trajectory in order to form a cutting or breaking plane of the workpiece, wherein an optical element is placed in the optical path of the laser beam or the optical path of the Gauss-Bessel laser beam, wherein the optical element comprises a transparent plate covering the Gauss-Bessel laser beam, the covered portion of the Gauss-Bessel laser beam passing through the transparent plate such that a symmetry of the Gauss-Bessel laser beam is disrupted to form an asymmetric Gauss-Bessel laser beam localized in the workpiece, the asymmetric Gauss-Bessel laser beam having an elongated shape in a plane perpendicular to a laser beam propagation direction and inducing the damage region having an elongated shape in the plane perpendicular to the laser beam propagation direction, and wherein the positioning mechanism is configured to perform a controlled displacement of the workpiece and the Gauss-Bessel laser beam relative to each other such that the damaged regions having the elongated shape from among the plurality of damage regions are induced longitudinally one after another along the predefined trajectory of the cutting or breaking plane in the workpiece.

2. The device of claim 1, wherein the laser source generates an ultrashort pulse Gaussian laser beam and directs it to the optical system, wherein a laser pulse duration and a laser pulse energy of the ultrashort pulse Gaussian laser beam is selected to exceed a material damage threshold of the workpiece.

3. The device of claim 1, wherein the transparent plate is arranged to create the asymmetric Gauss-Bessel laser beam by introducing an additional optical path for part of the Gauss-Bessel laser beam with respect to the other part of the Gauss-Bessel laser beam.

4. The device of claim 1, wherein the transparent plate is placed in the optical path of the Gauss-Bessel laser beam for partial coverage of the Gauss-Bessel laser beam for splitting the Gauss-Bessel laser beam into asymmetric parts, the asymmetric parts forming the asymmetric Gauss-Bessel laser beam.

5. The device of claim 1, wherein the transparent plate is positioned in the optical path of the laser beam or the optical path of the Gauss-Bessel laser beam covering part of the laser beam or the Gauss-Bessel laser beam, where the covered and uncovered parts of the laser beam or the Gauss-Bessel laser beam are symmetrical.

6. The device of claim 1, wherein the transparent plate comprises a first zone and a second zone of different thickness, which is placed in the optical path of the laser beam or the optical path of the Gauss-Bessel laser beam such that the laser beam or the Gauss-Bessel laser beam is split into a first part and a second part, where the first part passes through the first zone of the transparent plate and the second part passes through the second zone of the transparent plate.

7. The device of claim 1, wherein the transparent plate comprises a first zone and a second zone of different refractive index placed in the optical path of the laser beam or the optical path of the Gauss-Bessel laser beam such that the laser beam or the Gauss-Bessel laser beam is split into a first part and a second part, where the first part passes through the first zone of the plate and the second part passes through the second zone of the plate.

8. The device of claim 1, wherein the first movable stage is a rotary stage, to which the optical element is attached, and the second movable stage is a linear motion stage, to which the workpiece is attached, and wherein the rotary stage and the linear motion stage are controlled by the controller, the controller receiving commands from a computer according to the predefined trajectory of the cutting or breaking plane such that the direction of trajectory of the cutting or breaking plane is controlled by the rotary stage rotating the optical element, and the positioning of the plurality of damage regions in the workpiece at a certain displacement distance is controlled by the linear motion stage moving the workpiece.

9. The device of claim 1, wherein the first movable stage is a rotary stage, to which the optical element is attached, and the second movable stage is a linear motion stage, to which the workpiece is attached, the positioning mechanism comprising:

a Dove prism attached to the rotary stage and placed behind the optical element along the direction of propagation of the laser beam or the Gauss-Bessel laser beam, and wherein the rotary stage and linear motion stage are controlled by the controller, the controller receiving commands from a computer according to the predefined trajectory of the cutting or breaking plane such that the direction of trajectory of the cutting or breaking plane is controlled by the rotary stage rotating the Dove prism and the positioning of the plurality of damage regions in the workpiece at a certain displacement distance is controlled by the linear motion stage moving the workpiece.

10. The device of claim 9, further comprising a quarter wave phase plate placed between the optical element and the Dove prism along the direction of propagation of the laser beam or the Gauss-Bessel laser beam, the quarter wave phase plate changing the polarization state of the laser beam to circular.

11. The device of claim 9, further comprising a half wave phase plate placed between the optical element and the Dove prism along the direction of propagation of the laser beam or the Gauss-Bessel laser beam.

12. The device of claim 1, wherein the transparent plate comprises a planar input surface opposite a planar output surface.

13. The device of claim 1, wherein the optical element is a first optical element placed in the optical path of the laser beam or the optical path of the Gauss-Bessel laser beam;

a second optical element is placed in the optical path of the laser beam or the optical path of the Gauss-Bessel laser beam; and the first optical element is disposed between the laser source and the second optical element.

14. The device of claim 13, wherein the first optical element is configured to convert a symmetric Gaussian laser beam having a symmetric Gaussian intensity profile to an asymmetric Gaussian laser beam having an asymmetric Gaussian intensity profile and the second optical element is configured to convert the asymmetric Gaussian laser beam to the asymmetric Gauss-Bessel laser beam having the asymmetric Gauss-Bessel intensity profile.

15. The device of claim 13, wherein the first optical element is configured to convert a symmetric Gaussian laser beam having a symmetric Gaussian intensity profile to a symmetric Gauss-Bessel laser beam having a symmetric Gauss-Bessel intensity profile and the second optical element is configured to convert the symmetric Gauss-Bessel laser beam to the asymmetric Gauss-Bessel laser beam having the asymmetric Gauss-Bessel intensity profile.

16. The device of claim 1, wherein the transparent plate partially covers less than the entire Gauss-Bessel laser beam.

17. The device of claim 16, wherein the transparent plate covers half of the Gauss-Bessel laser beam such that covered and uncovered parts of the Gauss-Bessel laser beam are symmetrical.

18. The device of claim 1, wherein the intensity profile of the Gauss-Bessel laser beam has a half of a cone angle in the range from 4 to 45 degrees.

19. A method for processing transparent materials comprising the steps of:

generalizing a Gauss-Bessel intensity profile laser beam, localizing the Gauss-Bessel intensity profile laser beam in a workplace, wherein the material of the workplace is transparent to the Gauss-Bessel intensity profile laser beam, to form a damage region in the workpiece, the damage region extending a distance in the direction of propagation of the laser beam, performing controlled displacement of the workpiece and the laser beam with respect to each other to create additional adjacent damage regions in a predefined trajectory in order to form a cutting and/or breaking plane of the workpiece, wherein the generating a Gauss-Bessel intensity profile laser beam comprises generating an asymmetric Gauss-Bessel intensity profile laser beam by placing an optical element in an optical path of the beam, and wherein the asymmetry of the asymmetric Gauss-Bessel intensity profile laser beam is set by selecting a material of the optical element and/or parameters of the optical element and/or position of the optical element in the optical laser beam path in order to form an elongated shape of the Gauss-Bessel intensity profile laser beam in the plane perpendicular to the direction of propagation of the laser beam, the elongated shape having a longer axis and a shorter axis, the Gauss-Bessel intensity profile laser beam inducing a correspondingly elongated damage region in the workpiece, and wherein the controlled displacement of the workpiece and the asymmetric Gauss-Bessel intensity profile laser beam relative to each other is performed in such a manner that a plurality of the induced elongated shape damage regions are arranged in the workpiece longitudinally one after other along the predefined trajectory of the cutting and/or breaking plane.

20. The method of claim 19, wherein the Gauss-Bessel intensity profile laser beam is generated from a Gaussian intensity profile laser beam.

21. The method of claim 19, wherein the elongated damage region has an elliptical shape.

22. The method of claim 19, wherein the elongated shape damage regions in the plurality are positioned at a distance dx from another along the trajectory of the cutting and/or breaking plane, and wherein the distance dx between the centers of adjacent elongated shape damage regions is in the range from 0.5 to 15 times a length of the elongated shape damage region along the longer axis, and wherein the length of the elongated shape damage region along the longer axis from 1 μm to 20 μm, and the length of the elongated shape damage region along the axis is from 1.3 to 5 times larger than a length of the elongated shape damage region along the shorted axis.

23. The method of claim 19, wherein the workpiece is selected from the group consisting of glass, chemically strengthened glass, sapphire or other crystalline material.

24. The method of claim 19, wherein the distance of the damage region included in the workplace along the laser beam propagation direction is shorter than the thickness of the workpiece and is not adjoined to any of the surfaces of the workpiece, or the distance of the damage region coincides with the thickness of the workpiece and is adjoined to both of the surfaces of the workpiece, or the distance pf the damage region is shorter than the thickness of the workpiece and is adjoined to only one of the surfaces.

* * * * *